United States Patent [19]

Sakai et al.

[11] Patent Number: 4,598,350

[45] Date of Patent: Jul. 1, 1986

[54] POWER CONVERTER CONTROL APPARATUS AND POWER CONVERTER CONTROL METHOD

[75] Inventors: Takami Sakai; Haruhisa Inokuchi, both of Tokyo, Japan

[73] Assignee: Kabushiki Kaisha Toshiba, Kawasaki, Japan

[21] Appl. No.: 714,389

[22] Filed: Mar. 21, 1985

[30] Foreign Application Priority Data

Mar. 29, 1984 [JP] Japan .................. 59-61363

[51] Int. Cl.$^4$ .............................................. H02J 3/36
[52] U.S. Cl. ........................................ 363/35; 363/37; 323/207
[58] Field of Search ................. 363/35, 37, 51, 84–88, 363/96; 323/207

[56] References Cited

U.S. PATENT DOCUMENTS 3,906,335 9/1975 Watanabe et al. ..................... 363/35
4,264,951 4/1981 Konishi et al. ......................... 363/35
4,307,442 12/1981 Yano et al. ........................... 323/207
4,494,179 1/1985 Inokuchi et al. ...................... 363/35

OTHER PUBLICATIONS

International Conference on DC Power Transmission, Jun. 4–9, 1984, "Design and Control Strategies of HVDC–Schemes for AC Voltage Control and Stabilization", BBC Brown Boveri & Co. Ltd.
Direct Current, Sep., 1956.

Primary Examiner—Peter S. Wong
Attorney, Agent, or Firm—Oblon, Fisher, Spivak, McClelland & Maier

[57] ABSTRACT

A power converter control apparatus includes an automatic power controller for controlling a rectifier and an automatic reactive power controller for controlling an inverter. The inverter is coupled via DC power transmission lines to the rectifier. An output from the automatic power controller is utilized to change a control angle (or margin angle) of the inverter if a DC current flowing through the DC power transmission lines increases to exceed a rated current value of the apparatus, thereby allowing a stable power transmission.

11 Claims, 10 Drawing Figures

POWER CONVERTER CONTROL APPARATUS AND POWER CONVERTER CONTROL METHOD

BACKGROUND OF THE INVENTION

The present invention relates to an apparatus and a method for controlling power converters in a DC power transmission system, particularly for controlling active power preferential converters in which an automatic power controller (APC) or automatic frequency controller (AFC) and an automatic reactive power controller (AQC) or automatic voltage controller (AVC) are employed.

FIG. 1 shows a conventional power converter control apparatus for a DC power transmission system. Details of each element shown in FIG. 1 are known to a skilled person in the art. In FIG. 1, the DC circuit of a converter 1A is coupled via a DC reactor 2A, DC power transmission lines 3 and a DC reactor 2B to the DC circuit of a converter 1B. The AC circuit of converter 1A is coupled via a converter transformer 4A and a circuit breaker 5A to a 3-phase AC power line 6A. The AC circuit of converter 1B is coupled via a converter transformer 4B and a circuit breaker 5B to a 3-phase AC power line 6B.

Converter 1A (1B) is associated with an automatic margin angle regulator 11A (11B) and an automatic current regulator 13A (13B).

Automatic margin angle regulator 11A (11B) is provided for a prescribed control operation that the margin angle of converter 1A (1B) follows a given margin angle value E17A (E17B). According to this control operation, when value E17A (E17B) is fixed at a constant value, the margin angle of converter 1A (1B) becomes constant. Value E17A (E17B) is obtained from an adder 17A (17B). Adder 17A (17B) receives a minimum margin angle value E18A (E18B) from a margin angle presetter 18A (18B) and an output E48 from an automatic reactive power control circuit 48. The minimum margin angle of converter 1A (1B) is determined by value E18A (E18B). Output E48 is utilized to control the reactive power of AC line 6A (6B).

To achieve the reactive power control, circuit 48 is responsive to an output E46 from a subtracter 46. Subtracter 46 receives at its positive input an output E45 (reactive power reference) from a reactive power presetter 45 and at its negative input an output E47 from a reactive power detector 47. Detector 47 detects the magnitude of reactive power handled by converter 1A (1B). Thus, the reactive power is controlled in response to output E48 which represents the difference between E45 and E47, and the controlled reactive power follows the value of output E45.

In this manner, when the reactive power of AC line 6A (6B) at converter 1A (1B) side is to be controlled, the margin angle of converter 1B (1A) is controlled by output E48 so that the control angle of converter 1A (1B) is changed accordingly.

Incidentally, irrespective of the conversion functions (rectifying, inverting), converter 1A (1B) serves as a phase-delayed load for AC line 6A (6B), and the power factor of converter 1A (1B) is substantially proportional to the cosine of the delay of a control angle.

Automatic current regulator 13A (13B) is provided for a prescribed control operation that the amount of a DC current Id flowing through power transmission lines 3 depends on a given current control value E23A (E23B). Value E23A (E23B) is obtained from a subtracter 23A (23B). Subtracter 23A (23B) receives at its first negative input an output E22A (E22B) from a current/voltage converter 22A (22B), at its second negative input a current margin value E25A (E25B) from a current margin presetter 25A (25B) via a switch 24A (24B), and at its positive input an output E44 from an automatic power control circuit 44. Converter 22A (22B) receives an output E21A (E21B) from a current transformer 21A (21B) arranged at DC line 3, and converts the received E21A (E21B) into output E22A (E22B). Only one of switches 24A and 24B, which allows the corresponding converter (1A or 1B) to operate as an inverter, is closed or turned-on. According to the control operation of regulator 13A (13B), if output E44, which serves as a current reference, is fixed at a constant value, the amount of DC current Id becomes constant. Thus, DC current Id of lines 3 is controlled in accordance with output E44 from circuit 44.

Automatic power control circuit 44 is provided for controlling the power transfer between AC lines 6A and 6B. Circuit 44 is responsive to an output E42 from a subtracter 42. Subtracter 42 receives at its positive input an output E41 (active power reference) from a power presetter 41. The negative input of subtracter 42 receives an output E43 from a power detector 43 which detects the magnitude of power (active power) transmitted through DC lines 3. Thus, the power transfer is controlled in response to output E42 or E44 which represents the difference between E41 and E43, and the controlled power follows the value of output E41.

An output E11A (E11B) from automatic margin angle regulator 11A (11B) and an output E13A (E13B) from automatic current regulator 13A (13B) are supplied to an advanced control angle preference circuit 28A (28B). Circuit 28A (28B) selects either one of the supplied outputs in a manner that the control angle of the selected one is phase-advanced to the control angle of the non-selected one. The selected output from circuit 28A (28B) is converted via a phase control circuit 29A (29B) and pulse amplifier 30A (30B) into gate pulses E30A (E30B) which are used for triggering the switching elements in converter 1A (1B).

It is assumed that switch 24A is in an OFF state while switch 24B is in an ON state. In this case, advanced control angle preference circuit 28A selects output E13A from regulator 13A so that converter 1A serves as a rectifier (AC to DC converter), and circuit 28B selects output E11B from regulator 11B so that converter 1B serves as an inverter (DC to AC converter).

FIG. 2 illustrates a typical characteristic of the FIG. 1 power converter under the above assumption. In FIG. 2, the abscissa indicates a DC current Id flowing through lines 3 and the ordinate indicates a DC voltage Ed applied to lines 3.

Referring to FIG. 2, portions (a), (b) and (c) show an operation curve of converter (rectifier) 1A. Portions (a) and (b) indicate a voltage regulation characteristic. This characteristic depends on the commutation impedance of rectifier 1A as well as other associated circuit impedances thereof. Portions (b) and (c) indicate a constant current characteristic obtained by the operation of automatic current regulator 13A.

Portions (d), (e) and (f) show an operation curve of converter (inverter) 1B. Portions (d) and (e) indicate a constant current characteristic obtained by the operation of automatic current regulator 13B. Portions (e) and (f) indicate a constant margin angle characteristic of inverter 1B. This characteristic is obtained by the operation of automatic margin angle regulator 11B. In FIG. 2, the difference between the DC currents at portions (c) and (d) indicates a current margin defined by value E25B.

The operating point of converters 1A, 1B appears at a cross point (X) in FIG. 2, which is defined by the intersection between the operation curves of rectifier 1A and inverter 1B.

Assume a case wherein margin angle value E17B is increased by the operation of circuit 48 so that phase-delayed reactive power handled by inverter 1B is increased, while both converters 1A, 1B are operated at point (X) in FIG. 2. In this case, DC voltage Ed on lines 3 decreases, and the operation curve of inverter 1B shifts from solid line portions (d), (e) and (f) to broken line portions (dd), (ee) and (ff). Meanwhile, DC current Id from rectifier 1A is increased by the automatic power control operation of circuit 44 so that the decrease in DC voltage Ed (power down) is compensated. Then, the operation curve of rectifier 1A is shifted from solid line portions (a), (b) and (c) to broken line portions (a), (bb) and (cc), and the operating point of converters 1A, 1B is changed from point (X) to (XX).

Since the transmission power can be represented by the product of DC voltage Ed and DC current Id, the curve of constant power becomes hyperbolic and the operating point (X) of converters 1A, 1B is fixed on such a hyperbolic curve HC, as shown in FIG. 2.

As may be seen from the characteristic curves in FIG. 2, when switches 24B and 24A are turned-on and -off, respectively, DC voltage Ed of lines 3 is controlled by inverter 1B while DC current Id thereof is controlled by rectifier 1A, so that the transmission power becomes constant.

In general, a given rated current (which specifies the 100% current output) is assigned to a power converter for safety. From this, although not shown, a current limit circuit is provided at the output stage of power control circuit 44, thereby suppressing the amount of DC current Id below the rated current value.

As mentioned before, when the margin angle varies to control the reactive power, DC current Id of lines 3 varies to control the transmission power. However, if DC current Id increases to exceed the rated current value of the converter (rectifier 1A), the increased DC current is limited at the rated current value of 100% current output. Therefore, when the constant current characteristic of portions (bb) and (cc) in FIG. 2 represents the rated current value and current Id is limited at portions (bb) and (cc), only the margin angle can be increased with the increase of reactive power. In this case, the operation curve of inverter 1B is shifted from portions (dd), (ee) and (ff) to portions (dd), (eee) and (fff), and the operating point of converters 1A, 1B is shifted from point (XX) to (XXX). Since point (XXX) is out of the hyperbolic curve HC of constant power, the transmission power of DC lines 3 becomes low. This is an important problem to be solved.

In the above discussion, the combination of an automatic power control (APC) and automatic reactive power control (AQC) is adapted to the control system of converters 1A and 1B. However, the same discussion may be similarly applied to the combination of an automatic frequency control (AFC) for retaining the system frequency constant and an automatic voltage control (AVC) for adjusting the line voltage constant. In this case, automatic power control circuit 44 and automatic reactive power control circuit 48 in FIG. 1 are replaced with an automatic frequency control circuit and automatic voltage control circuit, respectively, and corresponding signal values used for the system control are changed accordingly.

Assume that the power converter control apparatus is provided with an automatic frequency controller (AFC) and automatic voltage controller (AVC), and that the voltage of AC line 6A is increased for some reason. In this case, for retaining the voltage of AC line 6A constant, the AVC increases the margin angle of inverter 1B so that the reactive power increases. At this time, the amount of the transmission power is reduced by the increase of reactive power, and the frequency of AC line 6A is lowered (or the phase-delay of rectifier 1A is increased) with the increase of reactive power. Then, the amount of DC current Id is increased (i.e., the component of active power is increased) so that the power down of lines 3 is compensated, thereby keeping the frequency constant. However, if DC current Id reaches the rated current value (100% current output), the amount of DC current Id cannot be increased any further, and the AFC operation at the rated current is disenabled. This is another problem to be solved.

In the above description, an automatic current control depending on the automatic power control (APC) or automatic frequency control (AFC) is applied to rectifier 1A side, and an automatic margin angle control depending on the automatic reactive power control (AQC) or automatic voltage control (AVC) is applied to inverter 1B side.

Inversely, an automatic current control depending on APC or AFC may be applied to inverter 1B side, and an automatic margin angle control depending on AQC or AVC may be applied to rectifier 1A side. FIG. 3 shows the operation curve corresponding to FIG. 2, wherein the automatic current control and automatic margin angle control are effected at inverter 1B and rectifier 1A, respectively.

During the operation at point (X) in FIG. 3, when phase-delayed reactive power is increased with the increase of a control delay angle according to the AQC operation, DC voltage Ed is decreased and the operation curve of rectifier 1A is shifted from portions (a), (b) and (c) to portions (aa), (bb) and (cc). Since the APC serves to maintain the transmission power constant, DC current Id is increased by a value corresponding to the decrease in DC voltage Ed. Accordingly, the operation curve of inverter 1B is shifted from portions (d), (e) and (f) to portions (dd), (ee) and (ff). At the end, the operating point (X) is shifted to another point (XX).

Assume here that portions (bb) and (cc) in FIG. 3 represent the rated current value (100% current output) and the control delay angle is further increased by the operation of AQC. Since the amount of DC current Id cannot be increased over the rated value, only the control delay angle is increased. Then, the operation curve of rectifier 1A is shifted from portions (aa), (bb) and (cc) to portions (aaa), (bbb) and (cc) so that the operating point (XX) is shifted to point (XXX), and further APC operation is no longer effected.

As will be understood from the above discussion, even if the automatic current control is effected at inverter 1B side, a similar problem that involved in a case wherein the automatic current control is effected at rectifier 1A side is invited.

The said problem (disenabling of power control at the rated current) could be involved in the following combinations of control modes:
 (a) automatic power control (APC) and automatic reactive power control (AQC);
 (b) automatic power control (APC) and automatic voltage control (AVC);
 (c) automatic frequency control (AFC) and automatic reactive power control (AQC); and
 (d) automatic frequency control (AFC) and automatic voltage control (AVC).

SUMMARY OF THE INVENTION

It is accordingly an object of the present invention to provide an apparatus for controlling the power or the frequency of power converters in a DC power transmission system, the operating range of which is expanded to a rated current value of the power converters.

Another object of the invention is to provide a power converter control apparatus for controlling active power preferential converters in which an automatic power controller (APC) and an automatic reactive power controller (AQC) are employed and the operating range is expanded to a rated current value of the power converters.

Another object of the invention is to provide a power converter control apparatus for controlling active power preferential converters in which an automatic power controller (APC) and an automatic voltage controller (AVC) are employed and the operating range is expanded to a rated current value of the power converters.

Another object of the invention is to provide a power converter control apparatus for controlling active power preferential converters in which an automatic frequency controller (AFC) and an automatic reactive power controller (AQC) are employed and the operating range is expanded to a rated current value of the power converters.

Another object of the invention is to provide a power converter control apparatus for controlling active power preferential converters in which an automatic frequency controller (AFC) and an automatic voltage controller (AVC) are employed and the operating range is expanded to a rated current value of the power converters.

Further object of the invention is to provide a method for controlling power converters in a DC power transmission system in a manner that the operating range is expanded to a rated current value of the power converters.

To achieve the above object, a power converter control apparatus of the invention includes an automatic power controller (APC) or automatic frequency controller (AFC) for controlling a first converter (rectifier 1A) and an automatic reactive power controller (AQC) or automatic voltage controller (AVC) for controlling a second converter (inverter 1B) which is coupled via DC power transmission lines (3) to the first converter (1A), wherein an output (E44, E44P) from the automatic power controller (APC) or an output (E44F) from the automatic frequency controller (AFC) is utilized to change a control angle (or margin angle) of the second converter (1B) if a DC current (Id) flowing through the DC power transmission lines (3) increases to exceed a rated current value of the apparatus, thereby allowing a stable power transmission.

DETAILED DESCRIPTION OF THE PREFERRED EMBODIMENTS

Figure 1:
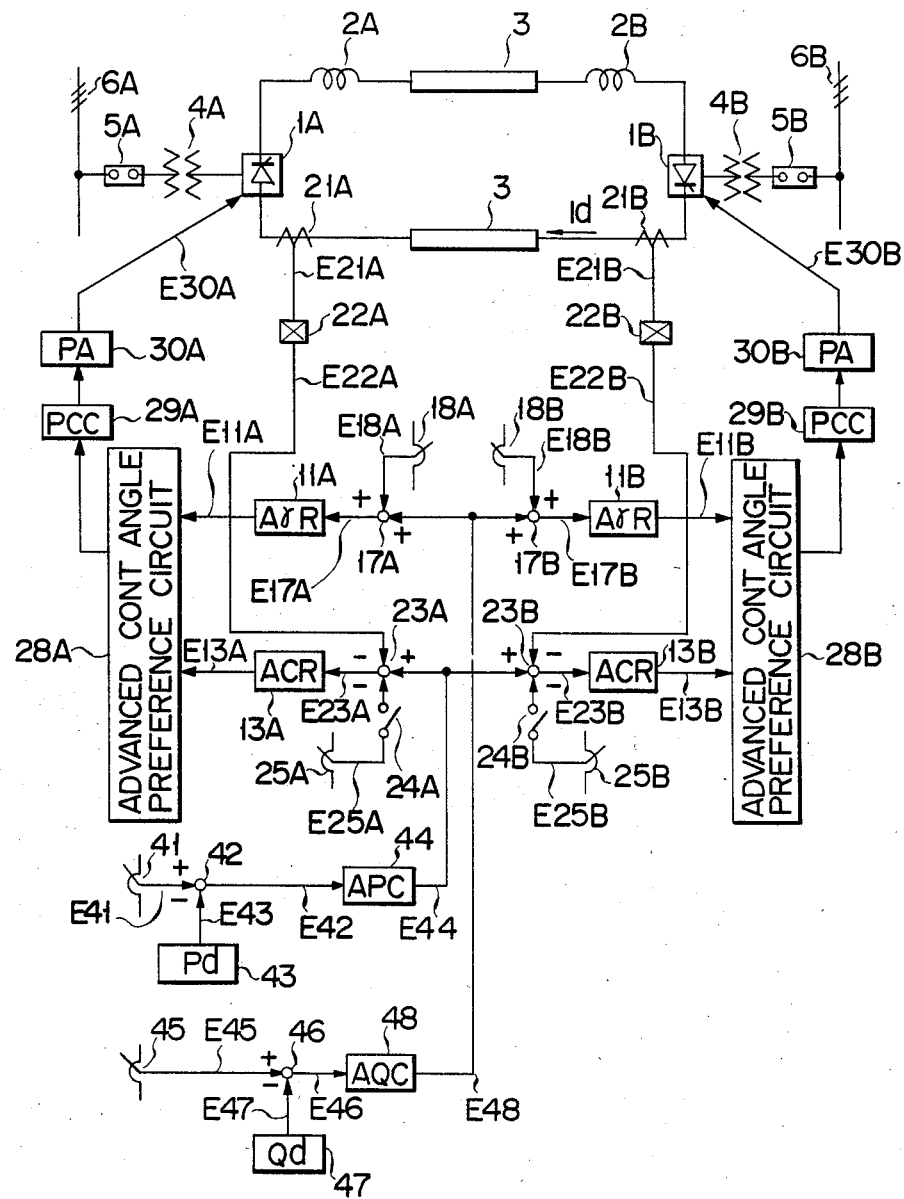
FIG. 1 shows a conventional control apparatus for power converters (rectifier/inverter) in a DC power transmission system.

Hereinafter, preferred embodiments of the invention will be described in detail with reference to the accompanying drawings. In the following description, the same or similar elements are denoted by the same or similar reference numerals throughout the drawings, thereby avoiding redundant explanations.

Figure 4:
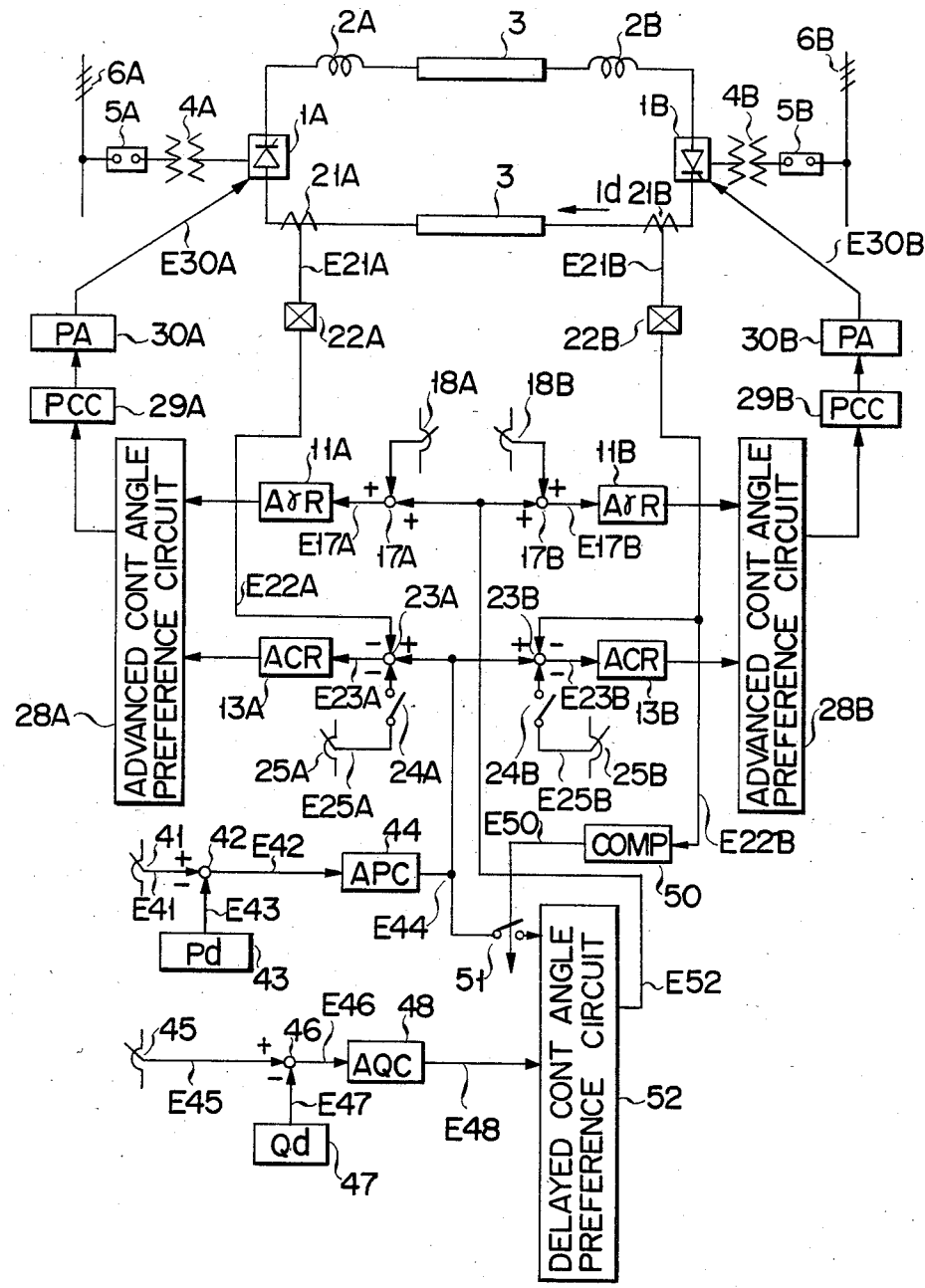
FIG. 4 shows an embodiment of a power converter control apparatus according to the present invention, wherein an automatic reactive power control is applied to an inverter (1B), and an automatic power controller (44) for a rectifier (1A) is used to change a control angle of the inverter (1B) when a DC current (Id) flowing through DC power transmission lines (3) increases to exceed a rated current value.

FIG. 4 shows an embodiment of the present invention. The key feature of the FIG. 4 embodiment resides in the configuration of elements 50 to 52.

In FIG. 4, output E22B from current/voltage converter 22B is supplied to a comparator 50 to which a predetermined comparison level is applied. Comparator 50 may have a hysteretic input characteristic in order to avoid hunting in the control operation. A Schmitt trigger circuit may be applied to such a hysteresis comparator. The signal level of output E22B represents the amount of DC current Id flowing through power transmission lines 3. The comparison level of comparator 50 corresponds to the rated current value (100% current output) of rectifier 1A. When the E22B level reaches the comparison level, comparator 50 generates a detection signal E50. Thus, the generation of signal E50 indicates the fact that DC current Id reaches or exceeds the rated current value.

Detection signal E50 from comparator 50 serves to turn-on a switch 51. When signal E50 is generated, switch 51 feeds a delayed control angle preference circuit 52 with an output E44 from automatic power control circuit 44. Circuit 52 also receives an output E48 from automatic reactive power control circuit 48. Although not shown, circuit 52 may be formed with a phase comparator and an analog switch which is on/off controlled by the comparison result of the phase comparator. The configuration of circuit 52 may be similar to a conventional configuration of preference circuit 28A or 28B, but the function of circuit 52 differs from that of circuit 28A or 28B. That is, when switch 51 is turned-on, circuit 52 selects either one of the supplied outputs E44 and E48 in a manner that the control angle of the selected one is phase-delayed from the nonselected one. The selected output E52 from circuit 52 is supplied to adders 17A and 17B. (When signal E50 is not generated and switch 51 is turned-off, output E52 from circuit 52 always corresponds to output E48. In this case, the operation of the FIG. 4 apparatus is the same as that of the FIG. 1 apparatus.)

When DC current Id of transmission lines 3 falls below the rated current or it is less than the 100% current output, the margin angle of inverter 1B is changed by output E48 so that the reactive power of inverter 1B is properly controlled. In this case, the control of reactive power invites no problem. However, when the margin angle is so increased by the reactive power control that circuit 44 reaches its control limit (i.e., when DC current Id reaches the rated current value), switch 51 is turned-on by output E50 from comparator 50. In this state, if the transmission power of lines 3 is less than the value corresponding to output E41 from power presetter 41, output E44 from circuit 44 increases so that circuit 52 selects output E44 in place of output E48. Then, the delay of a control angle for inverter 1B is increased and the margin angle is decreased, thereby retaining the prescribed power defined by output E41.

Figure 2:
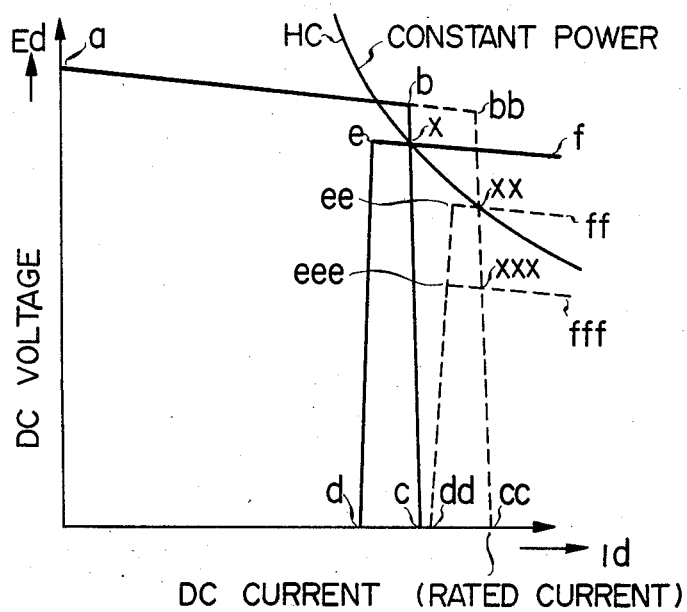
FIG. 2 shows operation characteristic curves of power converters, wherein an automatic current control depending on the automatic power control or automatic frequency control is applied to a rectifier (1A) side, and an automatic margin angle control depending on the automatic reactive power control or automatic voltage control is applied to an inverter (1B) side.

Referring to FIG. 2, it is assumed that the characteristic curve of portions (bb) and (cc) corresponds to the 100% current output (rated current), and that the operating point of converters 1A, 1B is shifted from (X) to (XX). At point (XX), the rated current flows, and switch 51 is turned-on so that delayed control angle preference circuit 52 selects output E44 from circuit 44. Then, automatic reactive power control circuit 48 no longer controls the margin angle of inverter 1B. From this, the operation curve of inverter 1B is fixed at portions (dd), (ee) and (ff), not shifted to portions (dd), (eee) and (fff). Accordingly, the operating point of converters 1A, 1B is retained at point (XX) at which the transmission of the prescribed power is ensured.

Figure 3:
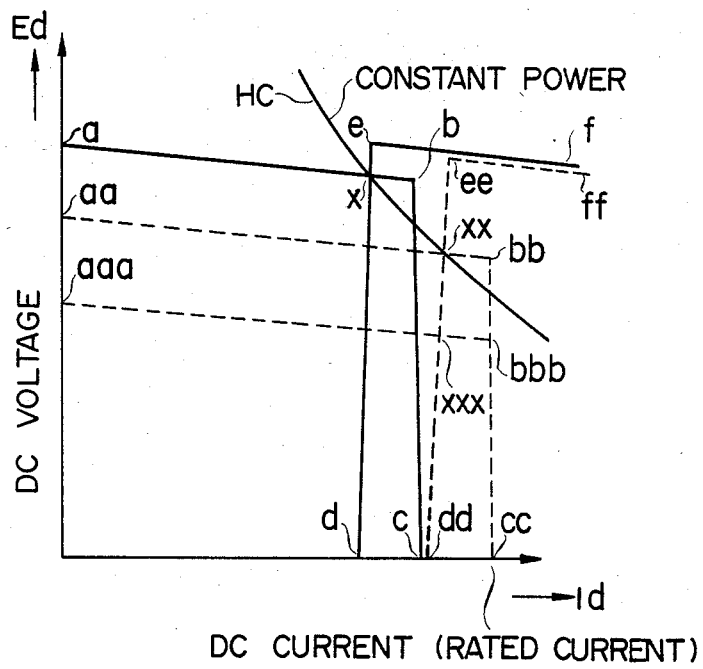
FIG. 3 shows operation characteristic curves of power converters, wherein an automatic current control depending on the automatic power control or automatic frequency control is applied to an inverter (1B) side, and an automatic margin angle control depending on the automatic reactive power control or automatic voltage control is applied to a rectifier (1A) side.

A similar advantage can be obtained where the automatic current control is effected at inverter 1B side. When the characteristic curves of FIG. 3 are applied to the present invention, the operation curve of portions (aa), (bb) and (cc) is not shifted to portions (aaa), (bbb) and (cc). Thus, the operating point of converters 1A, 1B is retained at point (XX) at which a constant power transmission with the rated current is ensured.

Incidentally, to prevent hunting in the control operation of converters, an ON- or OFF-relay timer located at the signal E50 circuit may be employed with a conventional comparator 50, instead of the use of a hysteresis comparator. Or, another automatic power control circuit having a specific transfer function which is different from the transfer function of circuit 44, may be used, as shown in FIG. 5.

Figure 5:
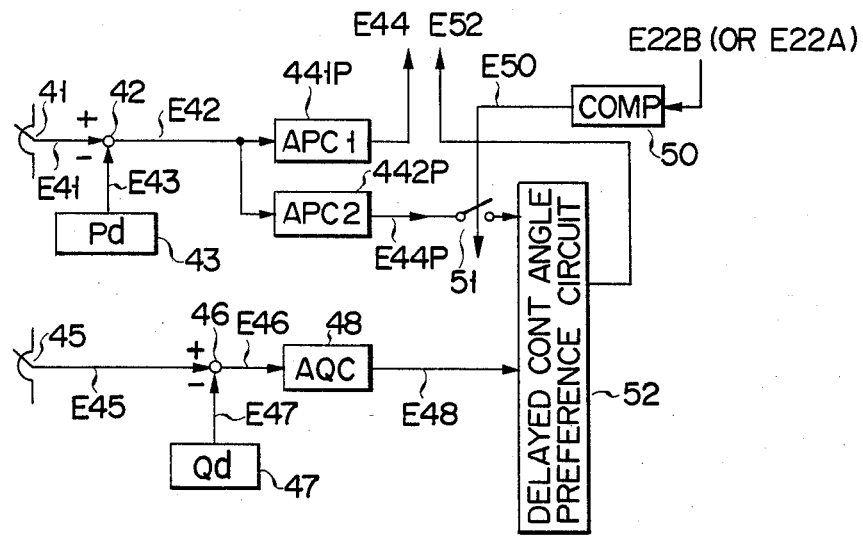
FIG. 5 shows a modification of the FIG. 4 embodiment, wherein an automatic reactive power controller (48) is applied to an inverter (1B), an automatic power controller (441P) is used to change a control angle of a rectifier (1A), and an additional automatic power controller (442P) is provided to change a control angle of the inverter (1B) when a DC current (Id) flowing through DC power transmission lines (3) increases to exceed a rated current value.

In FIG. 5, an automatic reactive power controller (AQC) 48 is provided to control inverter 1B, a first automatic power controller (APC1) 441P is provided to control rectifier 1A, and a second automatic power controller (APC2) 442P is provided to control inverter 1B when switch 51 is turned-on. Namely, when DC current Id flowing through DC power transmission lines 3 increases to exceed the rated current value, switch 51 is turned-on and the margin angle of inverter 1B is controlled by an output E44P from APC2. According to the FIG. 5 configuration, the transfer function of APC2 is independent of APC1 and can be determined optionally.

Figure 6:
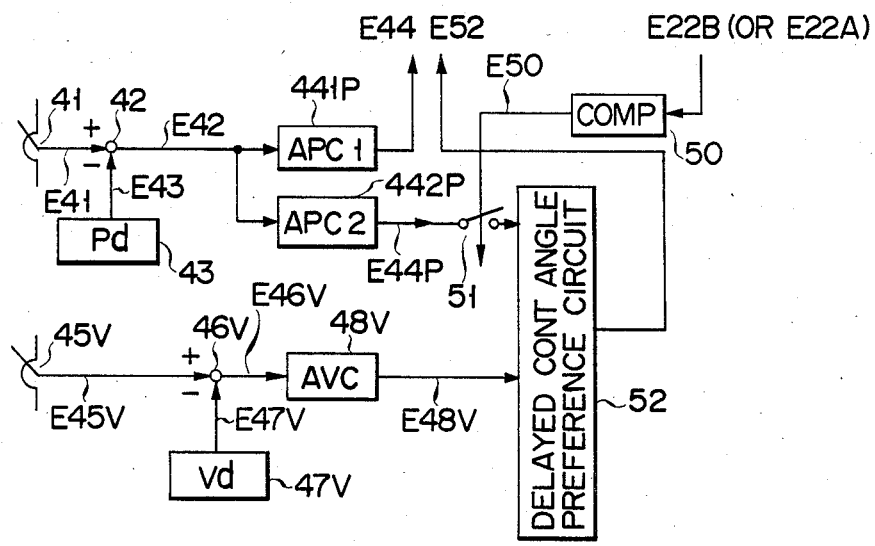
FIG. 6 shows another modification of the FIG. 4 embodiment, wherein an automatic voltage controller (48V) is applied to an inverter (1B), an automatic power controller (441P) is used to change a control angle of a rectifier (1A), and an additional automatic power controller (442P) is provided to change a control angle of the inverter (1B) when a DC current (Id) flowing through DC power transmission lines (3) increases to exceed a rated current value.

FIG. 6 shows a modification of FIG. 5. In FIG. 6, an automatic voltage controller (AVC) 48V is provided to control inverter 1B, first automatic power controller (APC1) 441P is provided to control rectifier 1A, and second automatic power controller (APC2) 442P is provided to control inverter 1B when switch 51 is turned-on. AVC 48V is responsive to an output E46V from a subtracter 46V. Subtracter 46V receives at its positive input an output E45V (voltage reference) from a voltage presetter 45V, and its negative input an output E47V from a voltage detector 47V which detects the voltage between DC lines 3. Output E46V representing the difference between E45V and E47V is amplified by AVC 48V. Then, AVC 48V supplies an output E48V to inverter 1B when switch 51 is turned-off, thereby achieving the line voltage control according to E45V. When DC current Id reaches the rated current value and switch 51 is turned-on, delayed control angle preference circuit 52 selects output E44P from APC2 and the margin angle of inverter 1B is controlled in accordance with E44P.

Figure 7:
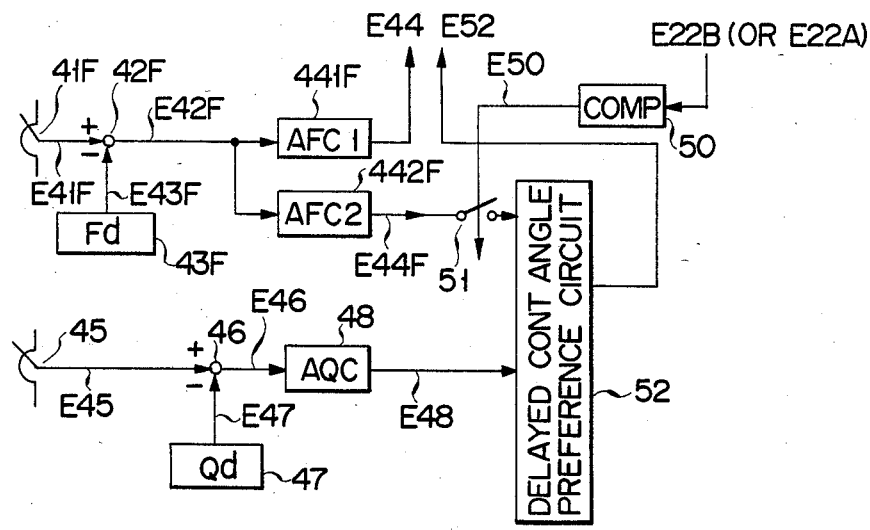
FIG. 7 shows another modification of the FIG. 4 embodiment, wherein an automatic reactive power controller (48) is applied to an inverter (1B), an automatic frequency controller (441F) is used to change a control angle of a rectifier (1A), and an additional automatic frequency controller (442F) is provided to change a control angle of the inverter (1B) when a DC current (Id) flowing through DC power transmission lines (3) increases to exceed a rated current value.

FIG. 7 shows a modification of FIG. 5. In FIG. 7, AQC 48 is provided to control inverter 1B, a first automatic frequency controller (AFC1) 441F is provided to control the frequency of rectifier 1A, and a second automatic frequency controller (AFC2) 442F is provided to control the margin angle of inverter 1B when switch 51 is turned-on. AFCs 441F and 442F are responsive to an output E42F from a subtracter 42F. Subtracter 42F receives at its positive input an output E41F (frequency reference) from a frequency presetter 41F, and its negative input an output E43F from a frequency detector 43F. The signal level of output E43F indicates the operation frequency of rectifier 1A. Output E42F represents the difference between E41F and E43F. Thus, rectifier 1A is controlled by an output E44 from AFC1 so that its frequency follows output E41F. When DC current Id flowing through DC power transmission lines 3 increases to exceed the rated current value, switch 51 is turned-on and the margin angle of inverter 1B is controlled by an output E44F from AFC2. According to the FIG. 7 configuration, the transfer function of AFC2 may be different from AFC1 and can be optionally determined. Incidentally, output E44 from AFC1 may be supplied to switch 51 in place of output E44F from AFC2.

Figure 8:
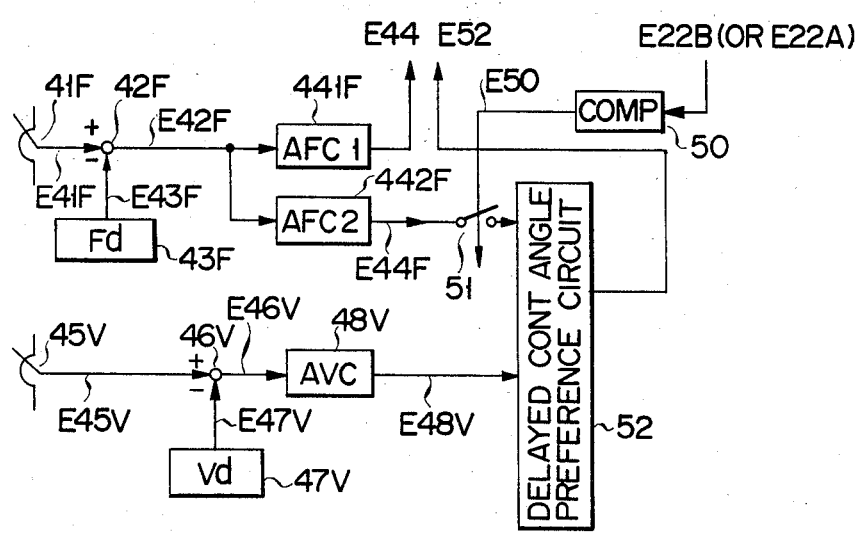
FIG. 8 shows another modification of the FIG. 4 embodiment, wherein an automatic voltage controller (48V) is applied to an inverter (1B), an automatic frequency controller (441F) is used to change a control angle of a rectifier (1A), and an additional automatic frequency controller (442F) is provided to change a control angle of the inverter (1B) when a DC current (Id) flowing through DC power transmission lines (3) increases to exceed a rated current value.

FIG. 8 shows a modification of FIG. 7. In FIG. 8, an AVC 48V is provided to control inverter 1B, AFC1 441F is provided to control rectifier 1A, and AFC2 442F is provided to control inverter 1B when switch 51 is turned-on. The circuit arrangement of AVC 48V is the same as that shown in FIG. 6. AVC 48V supplies an output E48V to inverter 1B when switch 51 is turned-off, thereby achieving the line voltage control according to output (voltage reference) E45V from voltage presetter 45V. When DC current Id reaches the rated current value and switch 51 is turned-on, delayed control angle preference circuit 52 selects output E44F from AFC2 and the margin angle of inverter 1B is controlled in accordance with E44F.

Figure 9:
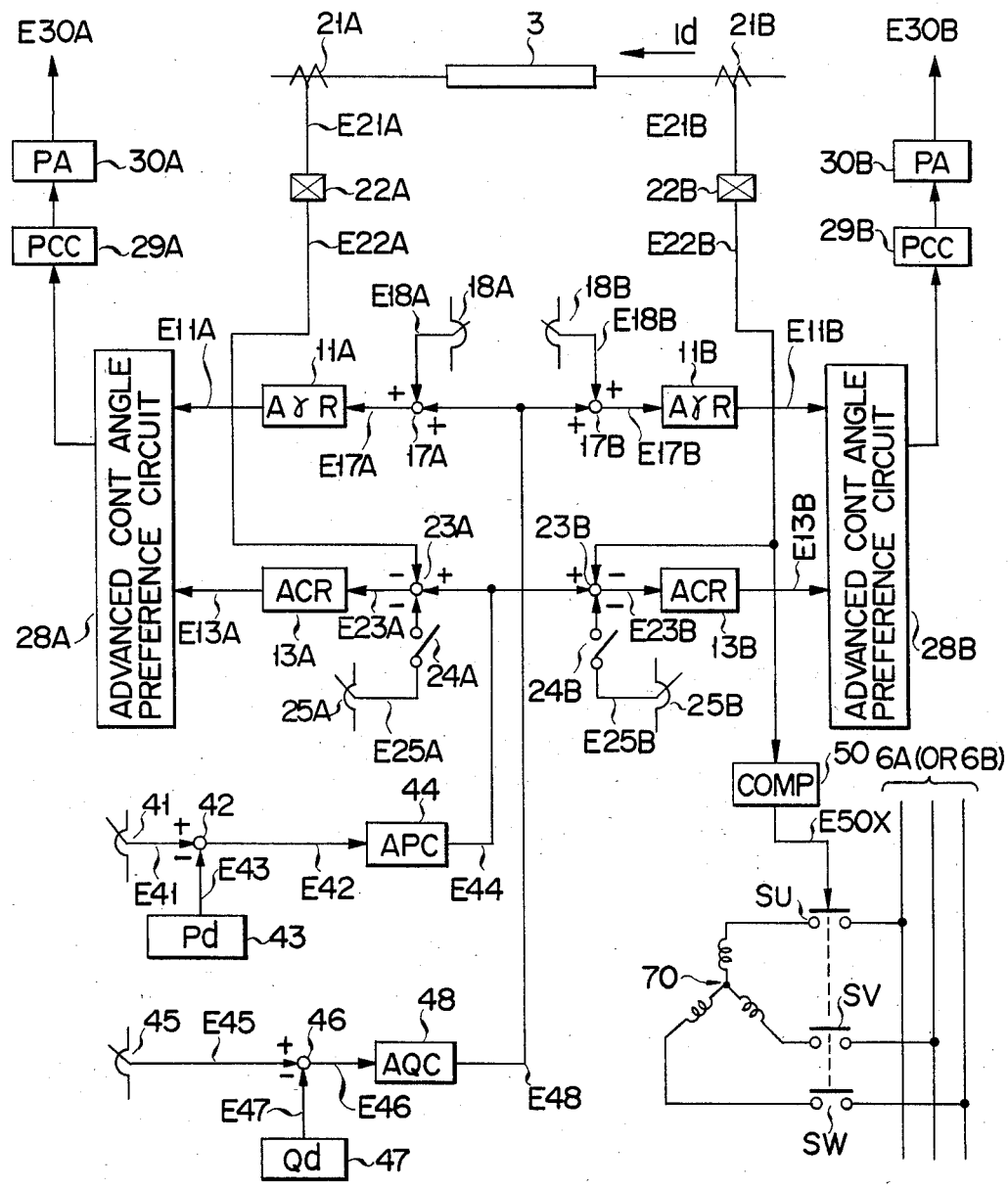
FIG. 9 shows another embodiment of a power converter control apparatus according to the present invention, in which a comparator (50) is provided to connect a reactor (70) to the AC line of a rectifier (1A) when a DC current (Id) flowing through DC power transmission lines (3) increases to exceed a rated current value.

FIG. 9 shows another embodiment of a power converter control apparatus according to the present invention. Except for elements 50, 70, SU, SV and SW, the configuration of FIG. 9 may be the same as that of FIG. 1. In FIG. 9, a comparator 50 generates a detection signal E50X when DC current Id increases to exceed the rated current value. Signal E50X renders the switches SU, SV and SW conductive. These switches connect a reactor 70 to 3-phase AC line 6A. Thus, when the flow of a current being equal to or more than the rated current is detected by comparator 50, reactor 70 is connected to AC line 6A so that the amount of reactive power is changed accordingly. Such a reactive power change is practically equivalent to a change in the margin angle of inverter 1B. Thus, the FIG. 9 embodiment may have substantially the same advantage as that obtained in the FIG. 4 embodiment. Incidentally, if an inductance-variable reactor is used for reactor 70 and the inductance thereof is servo-controlled by the signal level of E50X, a continuous reactive power control is achieved.

Figure 10:
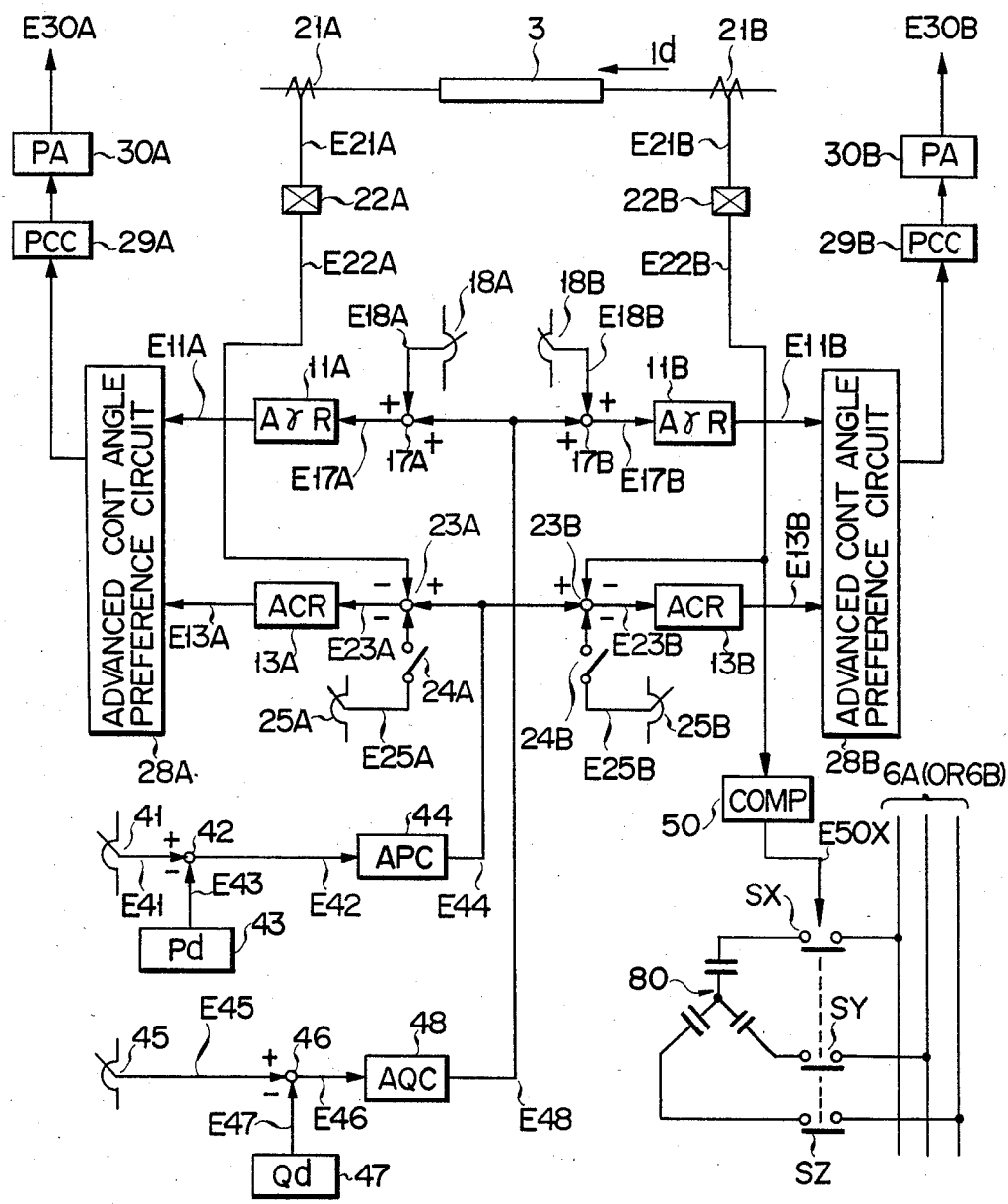
FIG. 10 shows a modification of the FIG. 9 embodiment, wherein a comparator (50) is provided to disconnect a capacitor (80) from the AC line of a rectifier (1A) when a DC current (Id) flowing through DC power transmission lines (3) increases to exceed a rated current value.

FIG. 10 shows a modification of the FIG. 9 embodiment. In FIG. 10, a capacitor 80 (phase-delaying reactive element) is used in place of reactor 70 (phase-advancing reactive element) of FIG. 9. According to the FIG. 10 configuration, when DC current Id reaches the rated current value, detection signal E50X from comparator 50 renders the respective switches SX, SY and SZ nonconductive. Then, capacitor 80 is disconnected from AC line 6A and the amount of reactive power is changed accordingly. Such a reactive power change is equivalent to a change in the margin angle of inverter 1B. Thus, the FIG. 10 embodiment may have substantially the same advantage as that obtained in the FIG. 4 embodiment.

Although not shown, to detect the rated current value, output E44 from circuit 44 may be used as the input signal of comparator 50. This is because, output E44 contains the information of output E43 from power detector 43, and the power detected by and obtained from detector 43 corresponds to the amount of DC current Id.

Incidentally, the star-connection of reactor 70 (FIG. 9) or capacitor 80 (FIG. 10) may be changed to a delta-connection or any other proper connection.

The present invention should not be limited to the embodiments disclosed herein. Various changes or modifications may be made without departing from the scope of the invention as claimed. For instance, the present invention may be applied to a converter control system of U.S. patent application Ser. No. 622,877 filed on June 21, 1984 the inventors of which are the same as those of the present application. To amplify the disclosure, all contents of the above U.S. patent application are incorporated in the present application.

What is claimed is:

1. A power converter control apparatus being adapted to a first converter and a second converter which is coupled to the first converter via power transmission lines, said power converter control apparatus comprising:

first control means for controlling said first converter so that a current of said power transmission lines follows a given current reference;

second control means for controlling said second converter so that reactive power handled by the power converter control apparatus follows a given margin angle value;

detector means for detecting whether or not the current of said power transmission lines reaches a given rated current value and generating a detection signal when said current reaches said given rated current value; and signal supply means for supplying, when said detection signal is generated, said second control means with a margin angle signal which corresponds to said given current reference and serves as said given margin angle value.

2. An apparatus according to claim 1, further comprising:

APC means coupled to said first control means and signal supply means, for detecting active power handled by said power converter control apparatus and generating an active power control signal which represents the detected active power, said active power control signal serving to control the current of said power transmission lines; and AQC means coupled to said signal supply means, for detecting reactive power handled by said power converter control apparatus and generating a reactive power control signal which represents the detected reactive power, said reactive power control signal corresponding to said given margin angle value when said detection signal disappears.

3. An apparatus according to claim 2, wherein said signal supply means includes:
  switch means coupled to said APC means and detector means, for passing said active power control signal when said detection signal is generated; and
  selection means coupled to said switch means and AQC means, for selecting either one of a signal passing through said switch means and said reactive power control signal in a manner that the phase of a selected signal is delayed from that of the non-selected signal, and supplying the selected signal to said second control means, said selected signal serving as said given margin angle value.

4. An apparatus according to claim 1, further comprising:
  APC means coupled to said first control means and signal supply means, for detecting active power handled by said power converter control apparatus and generating an active power control signal which represents the detected active power, said active power control signal serving to control the current of said power transmission lines; and
  AVC means coupled to said signal supply means, for detecting a voltage handled by said power converter control apparatus and generating a voltage control signal corresponding to the detected voltage, said voltage control signal corresponding to said given margin angle value when said detection signal disappears.

5. An apparatus according to claim 4, wherein said signal supply means includes:
  switch means coupled to said APC means and detector means, for passing said active power control signal when said detection signal is generated; and
  selection means coupled to said switch means and AVC means, for selecting either one of a signal passing through said switch means and said voltage control signal in a manner that the phase of a selected signal is delayed from that of the non-selected signal, and supplying the selected signal to said second control means, said selected signal serving as said given margin angle value.

6. An apparatus according to claim 1, further comprising:
  AFC means coupled to said first control means and signal supply means, for detecting a frequency handled by said power converter control apparatus and generating a frequency control signal which represents the detected frequency, said frequency control signal serving to control the current of said power transmission lines; and
  AQC means coupled to said signal supply means, for detecting reactive power handled by said power converter control apparatus and generating a reactive power control signal which represents the detected reactive power, said reactive power control signal corresponding to said given margin angle value when said detection signal disappears.

7. An apparatus according to claim 6, wherein said signal supply means includes:
  switch means coupled to said AFC means and detector means, for passing said frequency control signal when said detection signal is generated; and
  selection means coupled to said switch means and AQC means, for selecting either one of a signal passing through said switch means and said reactive power control signal in a manner that the phase of a selected signal is delayed from that of the non-selected signal, and supplying the selected signal to said second control means, said selected signal serving as said given margin angle value.

8. An apparatus according to claim 1, further comprising:
  AFC means coupled to said first control means and signal supply means, for detecting a frequency handled by said power converter control apparatus and generating a frequency control signal which represents the detected frequency, said frequency control signal serving to control the current of said power transmission lines; and
  AVC means coupled to said signal supply means, for detecting a voltage handled by said power converter control apparatus and generating a voltage control signal corresponding to the detected voltage, said voltage control signal corresponding to said given margin angle value when said detection signal disappears.

9. An apparatus according to claim 8, wherein said signal supply means includes:
  switch means coupled to said AFC means and detector means, for passing said frequency control signal when said detection signal is generated; and
  selection means coupled to said switch means and AVC means, for selecting either one of a signal passing through said switch means and said voltage control signal in a manner that the phase of a selected signal is delayed from that of the non-selected signal, and supplying the selected signal to said second control means, said selected signal serving as said given margin angle value.

10. A power converter control apparatus being adapted to a first converter and a second converter which is coupled to the first converter via power transmission lines, said power converter control apparatus comprising:
  first control means for controlling said first converter so that a current of said power transmission lines follows a given current reference;
  second control means for controlling said second converter so that reactive power handled by the power converter control apparatus follows a given margin angle value;
  detector means for detecting whether or not the current of said power transmission lines reaches a given rated current value and generating a detection signal when said current reaches said given rated current value; and
  impedance means for varying the phase of an AC power line coupled to said power converter control apparatus when said detection signal is generated.

11. A method for controlling a combination of a rectifier and inverter for DC power transmission lines, comprising the steps of:
  (a) when a current flowing through said DC power transmission lines is less than a given rated value (100% current output), said current is controlled in accordance with a given current reference so that a constant power transmission for said DC power transmission lines is performed; and
  (b) when said current is increased to exceed said given rated value, reactive power handled by the combination of a rectifier and inverter is controlled in accordance with said given current reference.

* * * * *